United States Patent
Auburger et al.

(10) Patent No.: US 8,607,734 B2
(45) Date of Patent: Dec. 17, 2013

(54) MILK TUBE FOR A MILKING UNIT

(75) Inventors: Markus Auburger, Lippstadt (DE); Reinhard Frenser, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 831 days.

(21) Appl. No.: 12/451,409

(22) PCT Filed: May 8, 2008

(86) PCT No.: PCT/EP2008/055702
§ 371 (c)(1),
(2), (4) Date: Dec. 8, 2009

(87) PCT Pub. No.: WO2008/138862
PCT Pub. Date: Nov. 20, 2008

(65) Prior Publication Data
US 2010/0089325 A1 Apr. 15, 2010

(30) Foreign Application Priority Data
May 11, 2007 (DE) .......................... 10 2007 022 802

(51) Int. Cl.
*A01J 5/00* (2006.01)
(52) U.S. Cl.
USPC .................................... 119/14.51; 119/14.18
(58) Field of Classification Search
USPC .......................................... 119/14.18, 14.51
See application file for complete search history.

(56) References Cited

U.S. PATENT DOCUMENTS

| 4,745,881 A * | 5/1988 | Larson ........................ 119/14.51 |
| 4,869,205 A | 9/1989 | Larson |
| 4,924,809 A | 5/1990 | Verbrugge |
| 5,125,909 A * | 6/1992 | Heimberger ................... 604/264 |
| 6,895,890 B1 | 5/2005 | Maier, Jr. |
| 6,895,891 B2 | 5/2005 | Maier, Jr. et al. |
| 7,395,780 B2 | 7/2008 | Maier, Jr. et al. |
| 7,637,228 B2 * | 12/2009 | Hatzack et al. ............. 119/14.51 |
| 2004/0025794 A1* | 2/2004 | Maier et al. ................. 119/14.51 |

FOREIGN PATENT DOCUMENTS

| AT | 251960 | 1/1967 |
| DE | 34 29 428 A1 | 11/1985 |
| WO | WO 00/69252 | 11/2000 |
| WO | WO 01/84913 A1 | 11/2001 |
| WO | WO 03/069981 a1 | 8/2003 |

OTHER PUBLICATIONS

English language Translated Description and Claims of AT 251960, European Patent Office's esp@cenet.com database, 3pp.
English language Abstract, Translated Description and Claims of DE 34 42 428 A1, European Patent Office's esp@cenet.com database, 5pp.

(Continued)

*Primary Examiner* — Kristen C Hayes
(74) *Attorney, Agent, or Firm* — Smith Law Office

(57) ABSTRACT

The invention relates to a milk tube for a milking unit, comprising two end regions lying opposite one another and an intermediate region, all regions being interconnected to form one piece. The intermediate region is composed of a soft material and at least one end region is composed of at least one hard material.

10 Claims, 1 Drawing Sheet

(56) References Cited

OTHER PUBLICATIONS

PCT/IB/338, Notification of Transmittal of Translation of the International Preliminary Report on Patentability received Dec. 31, 2009, 1p.

PCT/IB/373, International Preliminary Report on Patentability received Dec. 31, 2009, 1p.

PCT/ISA/237, Translated Written Opinion of the International Searching Authority received Dec. 31, 2009, 7pp.

\* cited by examiner

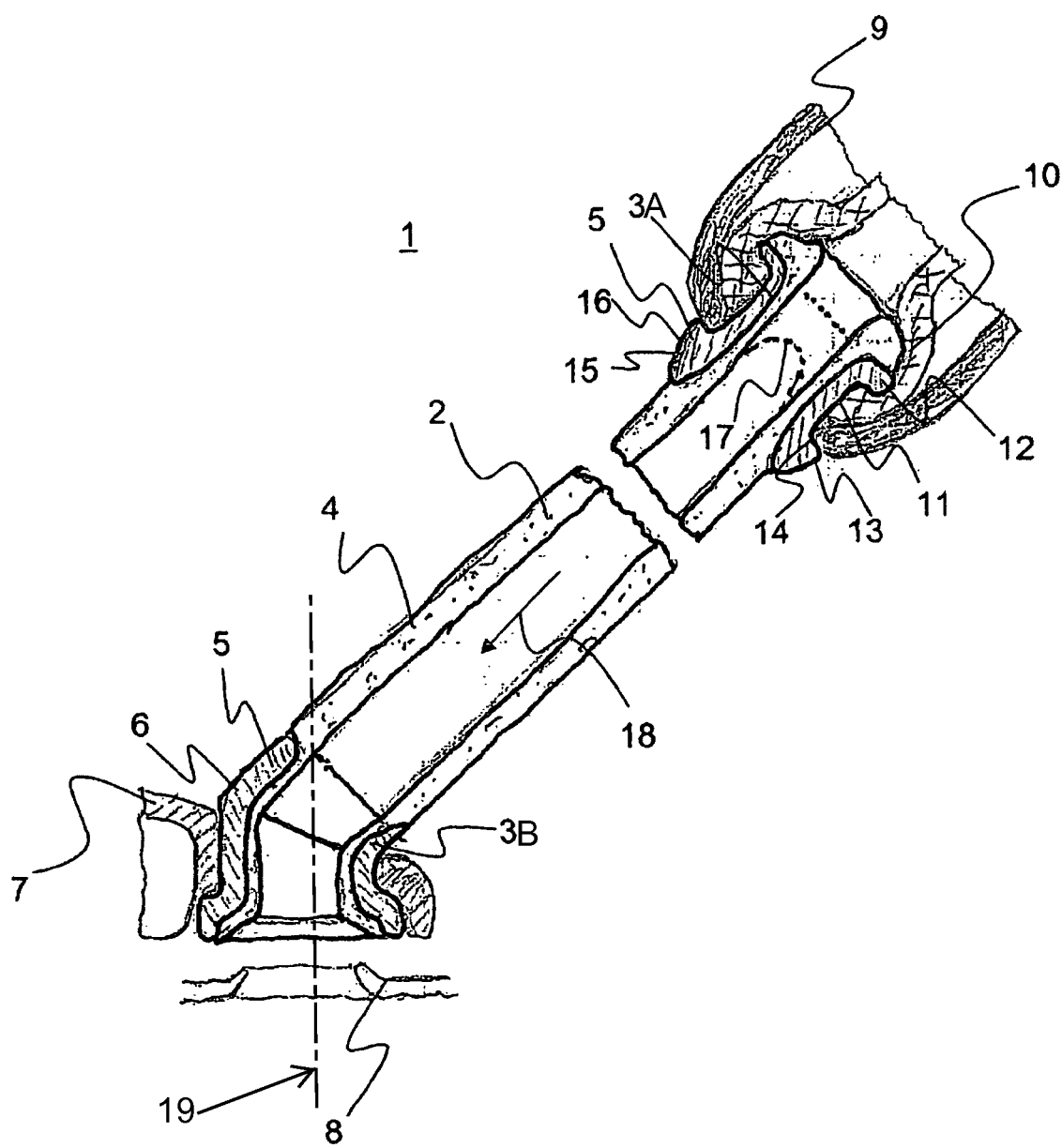

MILK TUBE FOR A MILKING UNIT

FIELD AND BACKGROUND OF THE INVENTION

The invention concerns a milk tube for a milking unit with two end regions lying opposite to one another and an intermediate region. Furthermore, the invention concerns a milking machine with milking tubes that are arranged together with teat cup liners in a multiple number of milking cups. Furthermore, the invention concerns a method for the manufacture of a milking cup with a milk tube, whereby a milk tube is connected to a teat cup through fixing means. The invention finds application in the dairy industry and especially in the production of milk.

For the milking of milk-producing animals, milking systems are used that may have different designs. The milking process as such is carried out with the aid of milking cups that are applied to the teats of the animal. A milking cup has a teat cup liner to which reduced pressure and atmospheric pressure is applied, corresponding to a pulsator frequency. For this purpose, the milking cup is connected to a pulsator tube and the milked milk is led away from the milking cups through a milk tube.

Milking systems are known in which each milk tube is connected to a milk collecting piece. For this purpose the milk collecting piece has connecting pieces over which a milk tube is attached in each case. Each of the connecting pieces has an end cut at a slant which facilitates attachment. The milk tube is clamped at the slanted cut edge when the teat cup hangs freely from the milk collecting piece. Such a design of a milking machine is known for example from DE 34 29 428 A1.

Due to the fact that the milk tube is exposed to alternating bending stresses at the slanted cup edge of the milk connecting piece, the tube is subjected to rapid aging and must be replaced more frequently. An essential problem is also that the short milk tubes may become damaged by sudden loads at the slanted cup edge of the connecting piece.

The milk tube is attached to the connecting piece by static friction. If the milk tube is pushed onto soiled surfaces or surfaces with fat on them, then here the friction is reduced. There is a danger that during the milking the milk tube will slide off from the connecting piece. Once the milk tube has slid off the connecting piece, it can hardly ever be remounted onto the connecting piece with safe functioning assured. The friction is essentially determined by the connecting piece/milk tube material pairing, so that the choice of materials is limited.

Another problem, which is not less severe, arises from the design of the tube connection due to the fact that complete cleaning can only be achieved with significant expenditure. Namely, hereby there is a danger that incomplete cleaning occurs, since flow-technological dead areas are formed within the milk tube, so that although the soil may have been separated by a cleaning, it can no longer be removed from the milk tube.

Furthermore it is known that vacuum fluctuations may be caused by the connecting pieces because the cross-section of the tube is changed by the bending. This leads to non-uniform milking processes.

Thus, as a result, it can be said that the systems known in the state of the art are either subject to increased wear and therefore must be replaced at regular intervals, or very thorough cleaning is required, which involves dismantling of the system.

SUMMARY OF THE INVENTION

Based on this, the task of the present invention is to create a milk tube which makes especially simple mounting possible with at the same time as little device-technological expenditure as possible.

The solution of the task is the milk tube for a milking unit named at the outset, with two end regions that lie opposite to one another and an intermediate region, whereby all regions are joined together to form one piece and the intermediate region is made of a soft material. Furthermore, at least one end region is manufactured from a hard material at least partly.

Hereby a soft material can be for example an elastically-deformable material, such as rubber, TPE or silicones. For this purpose especially such elastic components can also be used which have been approved for food-technological use in milking units.

Within the framework of the present invention especially a non-elastic material is to be understood as a hard material. This can be for example a metallic material or also a plastic that is solid at usual room temperatures. These are especially solid thermoplastic materials (TP). Examples of such thermoplastic materials are polyethylene (PE), polystyrene (PS), polyvinyl chloride (PVC) and polyamide (PA).

As a result of the use of different materials on a milk tube, according to the present invention it becomes possible to design these in such a way that on the one hand they can be connected especially easily at one end to a milking cup or at the other end to a milk collecting piece. At the same time, through the design of the intermediate region from a soft material the milk tube can be as flexible as before and its use is thereby facilitated. With the aid of an end region that is made of a solid material, the end regions of the milk tube can be designed so that they can be connected to the regions of the milking unit that have to be connected. Optionally, an end region or both end regions can be made from the hard material. In this case it is possible to create with a milk tube according to the invention a joint, for example between a milk collecting material and a milking cup, whereby the milk tube has on both ends specially-designed end regions that are especially designed for connection to the particular milk collecting container or milking cup of the milking unit.

In an advantageous further development of the invention, it is provided for this purpose that at least one end region has joining means for the connection to a milking cup or milk collecting container. As already explained before, here we are dealing with one of the essential areas of application for a milk tube according to the invention. The connection of the milking cup and milk collecting container represents an especially highly stressed zone within the milking unit, and therefore the milk tubes that are used in this location are to be replaced and/or cleaned relatively frequently. With the aid of the connecting means according to the invention, which are formed from the hard material in the end regions, however, the milk tube according to the invention can be mounted or replaced especially easily, in an operator-friendly and time-saving manner. As a result of this, on the one hand the maintenance of the installation during running operation is noticeable facilitated. On the other hand, the milk tubes according to the invention can also be replaced more frequently and introduced for example to cleaning, which in comparison to the milk tubes known in the state of the art so far can be done with a significantly reduced work expenditure.

Most particularly advantageous is hereby when the connecting means are made at least partly in a positive locking manner and they comprise especially locking means. As a result of this, a type of plug-in connection is created between the milk tube and the neighboring components of the milking unit. This can be done on one side or on both sides of the milk tube. Within the framework of the present invention, it is especially advantageous to design the connecting means as a locking means, which secures the milk tube on a milking cup and/or milk collecting container. Exchange or removal of the milk tube requires merely the loosening of the locking means and the milk tube can be removed.

An embodiment that is most particularly preferred by the invention provides that the end region of the milk tube has fixing means for the attachment of a teat cup liner. With the aid of such a fixing means, the milk tube can first be joined to a teat cup liner and then as a one-piece unit be mounted in the milking unit. During the mounting or maintenance of milking units, a great advantage arises from this as a result of the simplified mounting. Namely, in the case of the design according to the invention, the milk tube can be first mounted to the teat cup liner with the aid of the fixing means. Only then is the loose end of the milk tube led through the milking cup in the milk flow direction, and the teat cup liner, which is joined to the opposite end region of the milk tube, is pulled together with the milk tube into the milking cup. Complicated threading of the individual components, as it was required in the state of the art in the case of the multi-piece milk tubes and teat cup liners, is eliminated. Thus, the present invention combines the advantages of one-piece milk tubes with a teat cup liner molded on them with the advantages of multi-part milk tubes in which the teat cup liner and short milk tubes had to be mounted separately until now.

To achieve defect-free mounting, in addition it is advantageous for positioning means to be provided for positioning of the teat cup liner and milk tube to one another and/or to the milking cup. Teat cup liners that are introduced into a milking cup somewhat distorted have often proven to be possible sources of error in the past. For this reason, the invention provides positioning means which ensure that the teat cup liner assumes the correct relative position with respect to the milking cup. For example, for this purpose, under a collar of the teat cup liner ridges may be provided which can be inserted into complementarily-formed grooves in the outer wall of the milking cup and thus they provide assurance against turning around the longitudinal axis of the milking cup. A similar assurance against turning can naturally also be provided between the milk tube and the milking cup. However, alternatively, it is also possible to provide, alone or additionally to other positioning means, a positioning means between the teat cup liner and the milk tube so that these can be connected to one another only in a given position. By using the positioning means at the three contact points, that is, between teat cup liner and milking cup, between milking cup and milk tube, as well as between milk tube and teat cup liner, it is possible to assure correct mounting of the components. Hereby, in the simplest case, a positioning means can be provided only at one of the contact points.

Furthermore, for simple and reliable design of the milk tube according to the invention, it is advantageous when at least one hard material is arranged at least partly on an outer periphery of the milk tube. As a result of this, for example, the inside of the milk tube will come into contact only with one type of material. That is, that during the flow through the milk tube the milk comes into contact only with this single material which represents a special simplification from the food-technological point of view. Furthermore, the displacement of the boundary surfaces between the hard and soft material to the outside of the milk tube can allow a greater resistance to the development of leaks. Namely, in this case, none of the boundary surfaces between the two materials continues from the outside to the inside of the milk tube. Specifically, when the hard material forms a sleeve-shaped end region, which surrounds the soft material, this can serve at the same time as a joining or fixing means and also surround the intermediate region consisting of the soft material, providing additional protection.

Advantageously, the soft material is an elastomer, such as a liquid silicone (LSR), a thermoplastic elastomer (TPE), a rubber or a solid silicone (HTV). These materials among the other elastic and food-technologically allowed materials are available at a relatively low price, can be processed very well technologically, and their properties are known.

In contrast to that, the hard material is preferably a thermoplastic resin, such as for example a polyethylene, polystyrene, polyvinyl chloride or polyamide. Such thermoplastic materials are solid at room temperature and at the same time can be manufactured with known methods to produce work pieces made of several components. This can be for example a two-component injection molding method.

Another preferred embodiment provides that the bonding agent and the fixing means are arranged at the outer periphery of the milk tube. Even with this embodiment it is possible to form an intermediate region made of a soft material over the entire length of the tube, whereby here too the milk will come into contact with only a single material. The combination of bonding agents and fixing means at the outer periphery of the milk tube permits the milk tube to be bonded on the one hand to one of the components of the milking unit, such as, for example, the milk collecting container or the milking cup, and on the other hand to bind the teat cup liner to the milk tube with a fixing means so that the two together can be introduced together into the milking cup and under activation of the bonding agent can be mounted there securely.

Another advantageous embodiment of the invention provides that at least one area will be angled. This is especially advantageous on the side of the milk tube which is away from the milking cup, whereby this side as a rule opens into a milk collecting container. Due to the anatomy of the animals, the milk tubes are brought together from different directions to a milk collecting container. For this reason, they meet at the milk collecting container at an angle which is inclined with respect to the vertical. It is exactly this angle of impingement which can be imitated by an angled end region, as a result of which the milk tube will not undergo any further deformation at this location, and is protected. Furthermore, it is advantageous when the milk tube is supported rotatably around an approximately vertical rotary axis relative to the milk collecting container. Thus, the milk tube can adjust itself to different teat positions or can be adjusted by simple manual rotation.

In order to achieve satisfactory operation of a milking device, it is necessary to aerate the milk tube. For this reason it is preferably provided that at least one end region have an aeration device, which preferably introduces air in the direction of the milk flow and is arranged in the region of the milking cup. When the milk tube is made of two different materials, it is possible to create the aeration device especially in the hard material. For this purpose especially the end region made from the hard material is appropriate. In contrast to the known aeration devices of milk tubes, in this way separate components can be eliminated and the aeration device can be manufactured more cost-effectively. The aeration device if needed can be arranged in any area of the milk tube. Especially preferred are those embodiments in which the aeration device is arranged in the region of the milking cup. Especially those aeration devices are preferred which introduce air in a direction that coincides essentially with the flow direction of the milked milk.

Preferably the joining means according to the present invention is designed as a pairing of two hard materials. In this way for example the end region of the milk tube, which is made from the hard material, can be joined to the milk cup, which is made from a metal, through a locking joint that represents the joining means.

From another point of view, it is advantageous to form the fixing means as a pairing of a hard and a soft material. With this hard-soft pairing of materials it is possible to create an especially tight joint between the end region of the milk tube made of the hard material and a teat cup liner which is made from a soft material.

Quite especially advantageously within the framework of the present invention is when the joining means and the fixing means are arranged next to one another in the same section of the milk tube. In this way it is possible for the joining means and the fixing means to share a single supporting surface at the outer periphery of the milk tube, which is made from the hard material. Thus, the two fixing means create a support on this outer peripheral surface. Especially when the end region made of the hard material has a widening in the radial direction toward the end of the tube, it is possible with this widening to pull a teat cup liner attached to it into a milking cup and then to press the teat cup liner against the bottom of the milking cup. The position thus achieved is then maintained with the provided locking means so that by simply pulling the milk tube all the way to the stop, that is, by engaging the locking means, the milking cup with the teat cup liner mounted in it can be mounted very easily next to the connected milk tube.

The milking machine according to the invention, to which the invention further refers, has a multiple number of milking cups in which the teat cup liners are arranged. The teat cup liners are connected to a milk collecting container through milk tubes whereby the milk tubes are designed according to the present invention. Such a milking machine according to the invention, as already mentioned before, can be manufactured and maintained especially simply. With the milk tubes according to the invention, the replacement of the milk tubes and teat cup liners has become significantly simpler and more rapid. Moreover, for cleaning purposes as well, the milk tubes can be removed together with the teat cup liners in a simple manner and then mounted again. This requires neither great strength nor an especially high time expenditure.

Thus, a significant advantage is achieved with respect to the maintenance expenditure and the hygiene that it is possible to reach. In addition, it saves resources when a quasi-monoblock of two different materials is created that can be constructed as a monoblock. Thus, for example the milk tube can be made of an especially long-lasting silicone and the teat cup liner can be manufactured from a rubber. Hereby the worn teat cup liner can be replaced separately and the milk tube be used further. In contrast, in the conventional monoblock designs in which the milk tube and the teat cup liner are made of one piece and from one material, when one section is worn the other section must be disposed of too.

Finally, the invention concerns a method for the manufacture of a milking cup with a milk tube whereby a milk tube is connected to a teat cup liner with the aid of fixing means and then a free end of the milk tube is guided through the milking cup in the direction of milk flow, whereby the joint arrangement of milk tube and teat cup liner is joined to the milking cup with simultaneous activation of the joining means. The manufacture of a milking cup according to the method of the invention thus comprises only two steps. The first step consists essentially in bonding the milk tube to the teat cup liner. In the next step then the milk tube and teat cup liner are introduced together as a unit into the milking cup and preferably pulled through it in the direction of milk flow until the teat cup liner reaches its final position. In this state then the milk tube and teat cup liner are fixed by the locking means in the position thus reached relative to the milking cup.

The invention as well as the technical background are explained below further with the aid of the FIGURE. It is pointed out that the FIGURE shows an especially preferred embodiment of the invention to which the invention is nevertheless not limited. The following is shown in the drawing:

BRIEF DESCRIPTION OF THE DRAWING

FIG. 1 is an axial longitudinal section through a milk tube according to the invention.

DETAILED DESCRIPTION OF THE PREFERRED EMBODIMENT

FIG. 1 shows an axial longitudinal section through a milk tube 1 according to the invention. The milk tube 1 has an intermediate region 2, a first end region 3A, and a second end region 3B (sometimes referred to herein as "end regions 3"). The intermediate region 2 is made of a soft material 4. In contrast, the two end regions 3 are made of a hard material 5. The above end regions 3 are located exclusively at the outer periphery of the milk tube 1. This means that the milk that goes through the milk tube 1 in a milk flow direction 18 comes into contact only with the soft material 4 over the entire length of the milk tube 1. In the second end region 3B (left lower end) an angled area 6 can be seen. The angled area 6 opens into a cover 7 of a milk collecting container 8 which is not shown in further detail. In the region of the first end region 3A, a milking cup 9 is shown partly, and a teat cup liner 10 is shown partly as well.

The mounting of the milk tube 1 is carried out by guiding the teat cup liner 10 through the hard material 5 of the upper first end region 3A in a first step and bringing it on a fixing surface 11. An unintentional slipping of the teat cup liner 10 from milk tube 1 is prevented by a collar 12, which is located at one end of the milk tube 1 and which widens outward in the radial direction. In the direction opposite to that, the first end region 3A has a second collar 13 which prevents the teat cup liner 10 from slipping off in the opposite direction. The second collar 13 in the present embodiment shown here is also designed at the same time as a supporting surface 14 for a locking means 15. The supporting surface 14 serves in the mounted state additionally for securing the milk tube within the milking cup 9 with positive locking. The upper end region 3A has additionally a slanted insertion area 16, which facilitates the insertion of the combined milk tube together with the teat cup liner 10 into the milking cup 9. The locking means 15 formed by the supporting surfaces 14 are pressed together in the radial inward direction upon insertion into the milking cup 9, so that first the end region 3A can enter into the milking cup 9 through the opening which is designed to be smaller.

In order to facilitate this process, partial recesses 17 at the first end region 3A are provided so that the locking means 15 can be deformed relatively easily during the assembly process. In the design of the milk tube 1 presented above, the teat cup liner 10, the milking cup 9 and the milk tube 1 are pressed against one another through the first end region 3A so that a more secure hold and simultaneously good tightness are achieved.

Disassembly can be performed by simply loosening the locking means 15. After the locking means 15 is loosened, the milk tube can simply be removed together with the teat cup liner from the milking cup 9 and replaced. If necessary, it is also possible to separately replace only a single component, for example, the milk tube 1 or the teat cup liner 10, and then perform the assembly in the reverse direction. In the embodiment shown, the teat cup liner 10 and the milking cup 9 share a common fixing surface 11 on the outside of the upper end region 3A. However, in other alternate embodiments these can also be divided into several separate fixing surfaces 11. This would lead to a separation of the joining means and fixing means. While here the joining means for connecting the milk tube to the milking cup consists of the collar 12 and the locking means 15, the collar 12 and the collar 13 form the fixing means for fixing the teat cup liner 10 to the milk tube 1. As stated above, in other embodiments, if needed, the fixing means and joining means can be arranged separately from one another and can be designed in a different way. In order to provide an especially good adaptation of the milking unit to the different teat positions, the milk tube 1 is attached so that it can be rotated relative to the milk collecting container 8 around a rotary axis 19. Thus, in addition to the angled area 6, the milk tube 1 thus has a second possibility of adaptation to anatomical or spatial conditions.

Furthermore, the present invention is not limited to the practical examples presented here. Thus, for example, instead of the described materials, numerous other hard or soft materials can be used or the design of the joining means and fixing means can be varied.

The invention claimed is:

1. A milk tube for a milking unit, the milk tube comprising:
    a first end region, a second end region, and an intermediate region between and integrally formed with the first end region and the second end region, and the intermediate region is made of a relatively soft material; and the first end region includes:
        a teat cup joining portion formed of a relatively hard material on an outer periphery of the first end region of the milk tube and the teat cup joining portion defines an annular outwardly open surface for engaging a lower end of a milking cup; and
        a teat cup liner joining portion formed of a relatively hard material on an outer periphery of the first end region of the milk tube and the teat cup joining portion defines an annular outwardly open teat cup liner joining surface for engaging a lower end of a teat cup liner; and
    the second end region of the milk tube includes a milk collecting container joining portion.

2. The milk tube according to claim 1, whereby the relatively hard material of the teat cup joining portion is received into an annular recess of relatively soft material in the milk tube first end region.

3. The milk tube according to claim 1, and the
    teat cup joining portion includes a collar disposed for positioning the teat cup liner and the milk tube relative to one another.

4. The milk tube according to claim 1, whereby the relatively soft material is an elastomer.

5. The milk tube according to claim 1, whereby the relatively hard material is a thermoplastic resin.

6. The milk tube according to claim 1, whereby at least one end region is angled relative to a longitudinal axis of the milk tube.

7. The milk tube according to claim 1, whereby the teat cup joining portion is formed integrally with the teat cup liner joining portion.

8. The milk tube according to claim 1, whereby the teat cup joining portion is formed of a relatively hard and a relatively soft material.

9. The milk tube according to claim 1, whereby the teat cup joining portion includes a fixing surface.

10. The milk tube according to claim 1, and further comprising:
    a positioning collar for positioning the teat cup liner and the milk tube relative to the milking cup.

* * * * *